No. 728,312. PATENTED MAY 19, 1903.
B. SMITH.
WEED EXTERMINATOR.
APPLICATION FILED JULY 21, 1902.
NO MODEL. 2 SHEETS—SHEET 1.
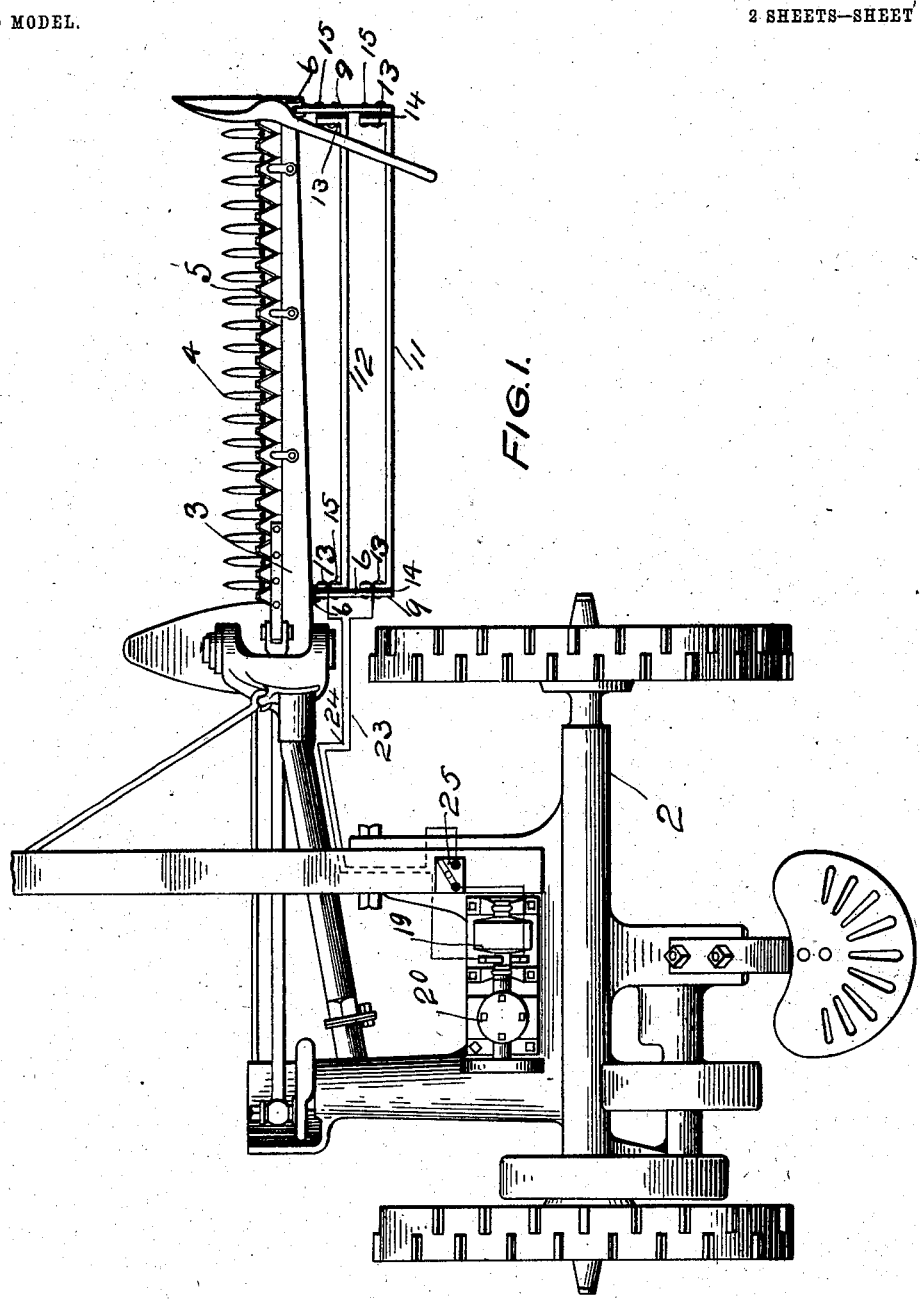
Witnesses
E. G. Staude
M. C. Norman
Inventor
Budd Smith
By Paul & Paul
his attorneys No. 728,312. PATENTED MAY 19, 1903.
B. SMITH.
WEED EXTERMINATOR.
APPLICATION FILED JULY 21, 1902.
NO MODEL. 2 SHEETS—SHEET 2.
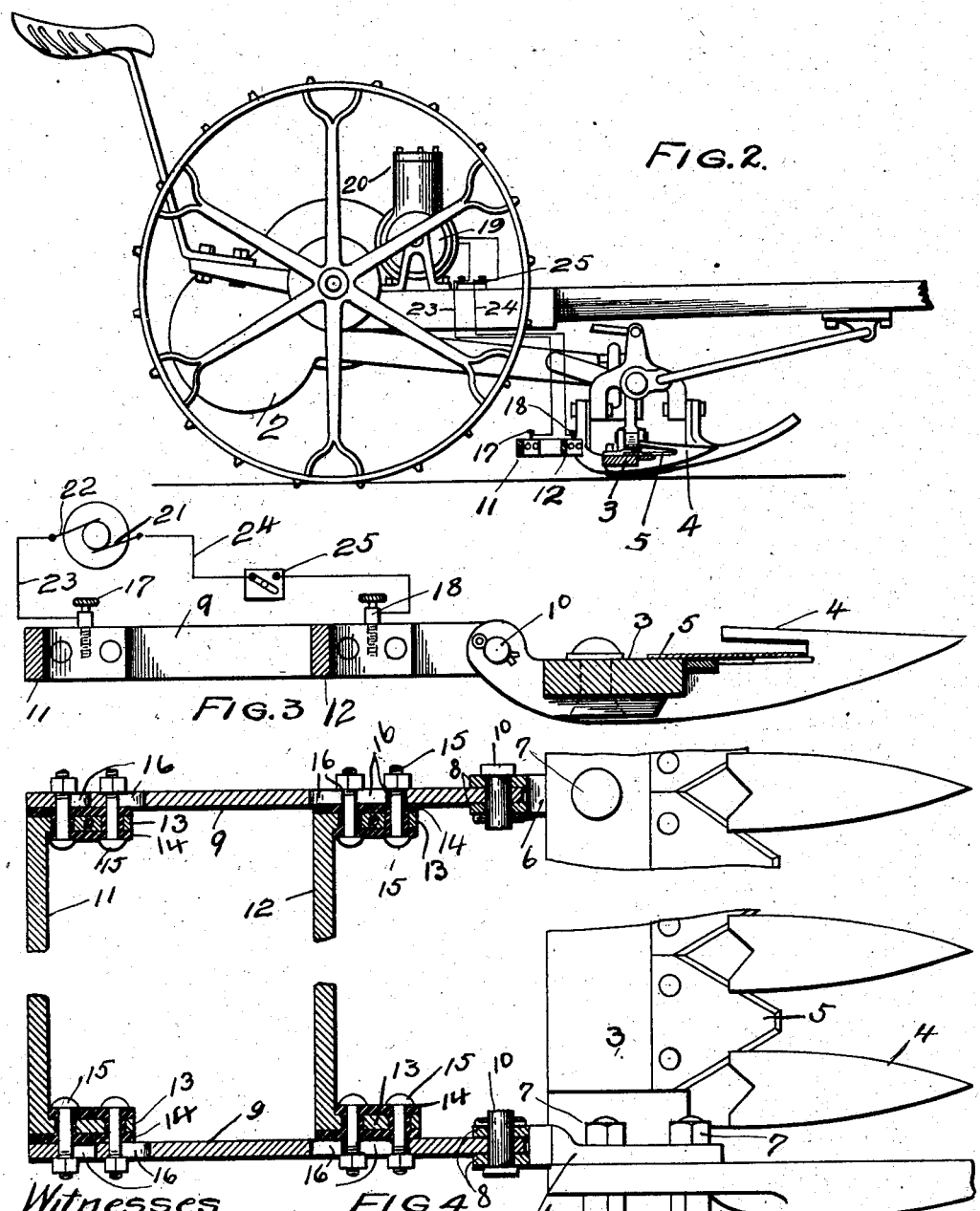
Witnesses
Inventor
Budd Smith
By Paul Paul
his attorneys No. 728,312. Patented May 19, 1903.

UNITED STATES PATENT OFFICE.

BUDD SMITH, OF AUSTIN, MINNESOTA.

WEED-EXTERMINATOR.

SPECIFICATION forming part of Letters Patent No. 728,312, dated May 19, 1903.

Application filed July 21, 1902. Serial No. 116,369. (No model.)

*To all whom it may concern:*

Be it known that I, BUDD SMITH, of Austin, Mower county, Minnesota, have invented certain new and useful Improvements in Weed-Exterminators, of which the following is a specification.

My invention relates to appliances for destroying weeds and noxious grasses in the fields; and the primary object of the invention is to provide a device capable of attachment to any vehicle or farm implement, but particularly designed for use with a mowing-machine.

A further object is to provide an exterminator adapted to be attached to the cutter-bar of a mowing-machine without in any way interfering with the movement of the knife-blade and arranged to discharge a current of electricity into the freshly-cut ends of the weed or grass stalks as the machine moves over the field.

Other objects of the invention will appear from the following detailed description.

The invention consists generally in various constructions and combinations, all as hereinafter described, and particularly pointed out in the claims.

In the accompanying drawings, forming part of this specification, Figure 1 is a plan view of a mower with my weed-exterminator appliance arranged thereon. Fig. 2 is a side view of the same with the cutter-bar and electrodes in section. Fig. 3 is a detail section of the cutter-bar and electrodes; and Fig. 4 is a plan view of a portion of the cutter-bar, showing the manner of connecting the electrodes thereto and the adjustable supports for the electrodes.

In the drawings, 2 represents a mowing-machine of the ordinary type, from which for clearness of description I have omitted the usual operating-levers.

3 represents the usual knife or cutter-bar, having the fingers 4 and knife 5. Near the ends of the bar I provide plates 6, secured by bolts 7 to the bar and having forked ends 8 to receive the ends of bars 9, that are pivotally connected to said forked ends by pivot-pins 10, which pass through holes in said forks and in the ends of said bars. This pivotal connection of the bars permits them to oscillate vertically and adjust themselves to any unevenness of the ground over which the machine is passing.

11 and 12 represent electrodes connecting the bars 9 and provided with turned ends 13, which, with the electrodes, are separated from the bars 9 by suitable insulation 14. Bolts 15 pass through the ends 13 and the insulation and are adjustable within slots 16 in the bars 9 to permit the electrodes to be adjusted to vary the distance between them, according to the area of the patches of weeds or grass that it is desired to exterminate. Each electrode is provided with binding-posts 17 and 18, one representing the positive and the other the negative pole of the generator. The apparatus which I prefer to provide for generating the electric current consists of a dynamo 19, mounted on the mowing-machine frame and preferably connected and driven from a small engine 20, though, if preferred, the dynamo may be geared to and driven from the wheels of the mower. The brushes 21 and 22 are connected by wires 23 and 24 with the binding-posts 17 and 18, and I prefer to place a switch 25 in the circuit to enable the operator to shut off the current whenever desired, and he may also by a clutch device (not shown) throw the engine and dynamo out of gear and prevent continuous generation of the current, if it seems advisable. The electrodes travel behind the cutter-bar and knife, and as the weeds and grasses that it is desired to kill are mowed down their freshly-cut stalks will be engaged by the electrodes. The sap flowing from the ends of the stalks will form a good conductor for the electric current, and as soon as both electrodes are in contact the circuit will be closed from one electrode to the other through the stalks and their spreading roots. As long as the electrodes are simultaneously in contact with the weeds the current will flow down through the stalks, killing the roots and completely destroying the growth of weeds and grasses that tend to choke and kill out the other grasses in the field. By using the device in connection with a mowing-machine knife and closing the circuit through the freshly-cut ends of the stalks or stems I am able to use a current of much lower voltage than has heretofore been considered necessary for devices of this kind. Of course the electrodes will discharge a current into all the freshly-cut stalks that may come in contact therewith; but as the weeds and grasses that cause injury to the field usually grow in patches it will seldom happen that any grass will be killed other than the kind that the operator desires to exterminate.

The apparatus being attached to a mowing-machine without in any way interfering with its operation can be utilized or not, as desired, and if used will not to any appreciable extent increase the draft of the machine or the labor of running it. Where the patches of weeds and grass are small and scattered, the operator will adjust the electrodes to shorten the distance between them and insure the closing of the circuit as the electrodes pass over the ends of the freshly-cut stalks.

I am aware that devices of this kind have been used heretofore for exterminating weeds; but it has been necessary to provide a current of high voltage to insure the closing of the circuit through the uncut stalks or stems, and in some instances a dampening device has been provided to travel ahead of the electrodes to moisten the stalks and make them better conductors. In my improved apparatus, however, the stalks are cut off by the knife of the mower and it is only necessary to provide a current of sufficiently high voltage to destroy the roots of the weeds, the sap from the freshly-cut ends of the stalks forming a good conductor for the electric current.

I claim as my invention—

1. The combination, with a mowing-machine cutter-bar and knife, of electrodes pivotally connected therewith and insulated therefrom, said electrodes being arranged one in advance of the other in the rear of the knife, an electric generator, and suitable connections provided between said generator and said electrodes.

2. The combination, with a cutter-bar, of the bars 9 hinged thereon and in the rear thereof, electrodes 11 and 12 secured to said bars 9 and insulated therefrom, an electric generator, and wires provided with a suitable switch and connecting the brushes of said generator with said electrodes.

3. In a mowing-machine, the combination, with a cutter-bar and knife, of electrodes arranged one in front of the other in the rear of said knife and insulated therefrom and from each other, and adapted to contact with the freshly-cut ends of stems and stalks after the knife has passed over them, and an electric generator having its poles connected respectively with said electrodes.

In witness whereof I have hereunto set my hand this 16th day of July, 1902.

BUDD SMITH.

In presence of—
R. E. SHEPHERD,
S. J. BLUMENTHAL.